United States Patent
Wieser et al.

(10) Patent No.: US 10,703,583 B2
(45) Date of Patent: Jul. 7, 2020

(54) STACKING STATION FOR A THERMOFORMING PLANT, METHOD FOR PRODUCING CUP-SHAPED PRODUCTS AND THERMOFORMING PLANT

(71) Applicant: KIEFEL GmbH, Freilassing (DE)

(72) Inventors: Gerhard Wieser, Piding (DE); Peter Knoll, Ainring (DE)

(73) Assignee: KIEFEL GmbH (DE)

( * ) Notice: Subject to any disclaimer, the term of this patent is extended or adjusted under 35 U.S.C. 154(b) by 287 days.

(21) Appl. No.: 14/652,873

(22) PCT Filed: Mar. 21, 2014

(86) PCT No.: PCT/DE2014/000146
§ 371 (c)(1),
(2) Date: Jun. 17, 2015

(87) PCT Pub. No.: WO2014/146639
PCT Pub. Date: Sep. 25, 2014

(65) Prior Publication Data
US 2015/0336752 A1 Nov. 26, 2015

(30) Foreign Application Priority Data
Mar. 22, 2013 (DE) .................. 10 2013 004 920

(51) Int. Cl.
*B65G 57/16* (2006.01)
*B29C 51/18* (2006.01)
(Continued)

(52) U.S. Cl.
CPC .............. *B65G 57/16* (2013.01); *B29C 51/00* (2013.01); *B29C 51/18* (2013.01); *B65G 57/08* (2013.01); *B65G 57/165* (2013.01)

(58) Field of Classification Search
CPC ........ B65G 57/16; B65G 57/28; B65G 57/08; B65G 57/165; B29C 51/266; B29C 51/44
(Continued)

(56) References Cited

U.S. PATENT DOCUMENTS 2,233,850 A * 3/1941 Rapley ................. B65G 37/00
198/408
2,559,819 A * 7/1951 Hettinger ................ B65B 35/44
198/407
(Continued)

FOREIGN PATENT DOCUMENTS

CN 105073611 A 11/2015
DE 25 41 531 A1 3/1977
(Continued)

OTHER PUBLICATIONS

English translation, provided by Google Patents, of DE4244089A1.*
International Search Report of PCT/DE2014/000146, dated Sep. 8, 2014.

*Primary Examiner* — Robert C Dye
*Assistant Examiner* — Taryn Trace Willett
(74) *Attorney, Agent, or Firm* — Tarolli, Sundheim, Covell & Tummino LLP

(57) ABSTRACT

The invention relates to a stacking station for a thermoforming installation, to a method for producing cup-shaped products in a thermoforming installation and to a thermoforming installation equipped therewith. Ejecting products out of a film plane onto an additional conveyor belt using a pusher is known. The additional conveyor belt first brings the products to a tilting device. After actuation of the tilting device, the products lie on their side and are conveyed onward from there. The present invention provides first pre-stacking the products coming from the ejector, to then (Continued)

Figure 1:
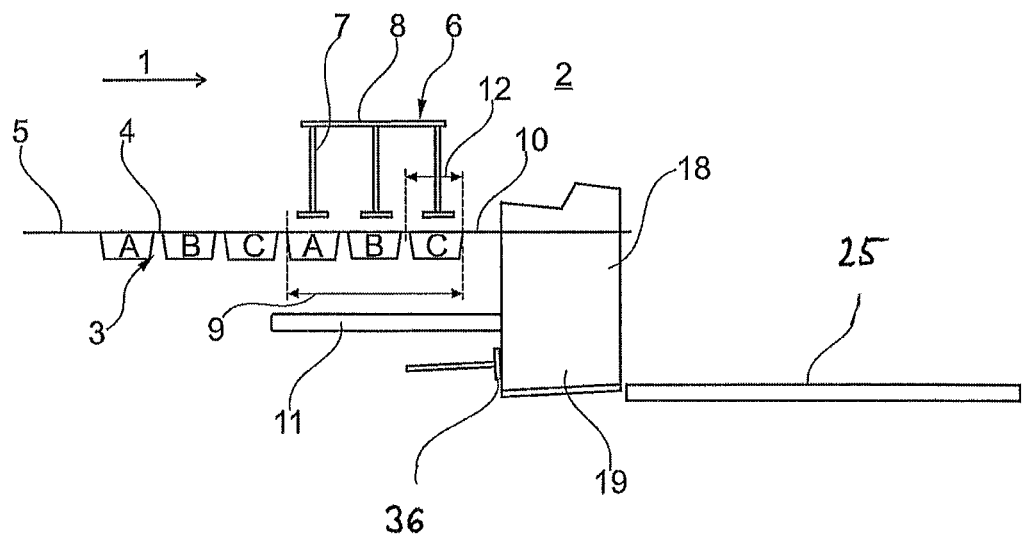

tilt them, preferably by way of their own weight, and to stack them only once they are lying.

15 Claims, 6 Drawing Sheets

(51) Int. Cl.
*B29C 51/00* (2006.01)
*B65G 57/08* (2006.01)

(58) Field of Classification Search
USPC ......... 414/788.3, 788.6, 790.4, 790.3, 790.6; 214/6 BA, 6 DS, 7; 301/2 R, 31
See application file for complete search history.

(56) References Cited

U.S. PATENT DOCUMENTS

| | | | | |
|---|---|---|---|---|
| 2,596,228 A | * | 5/1952 | Fletcher | B65G 47/1492 |
| | | | | 193/44 |
| 3,282,399 A | * | 11/1966 | Morton | A21C 15/00 |
| | | | | 198/462.3 |
| 3,337,064 A | * | 8/1967 | Mojden | B65G 51/02 |
| | | | | 271/177 |
| 3,511,395 A | * | 5/1970 | Brown, Jr. | B65B 41/06 |
| | | | | 221/262 |
| 3,566,576 A | * | 3/1971 | Ayres | A01D 87/12 |
| | | | | 414/790.3 |
| 3,685,671 A | * | 8/1972 | Layman | B65G 57/165 |
| | | | | 406/70 |
| 3,741,366 A | * | 6/1973 | Van Melle | B65G 47/1471 |
| | | | | 198/400 |
| 3,774,782 A | * | 11/1973 | Lewis, Jr. | B65G 47/24 |
| | | | | 221/163 |
| 3,774,783 A | * | 11/1973 | Miller | B65G 49/068 |
| | | | | 271/181 |
| 3,827,582 A | * | 8/1974 | Lederer | B65G 47/28 |
| | | | | 198/419.1 |
| 3,866,741 A | * | 2/1975 | Carbon | B65G 57/11 |
| | | | | 198/402 |
| 3,924,758 A | * | 12/1975 | Gram | B65B 35/50 |
| | | | | 414/798.4 |
| 3,932,982 A | * | 1/1976 | Klapp | B65B 25/143 |
| | | | | 271/184 |
| 4,049,260 A | * | 9/1977 | Szymborski | B65H 1/22 |
| | | | | 271/151 |
| 4,526,074 A | * | 7/1985 | Johnson | B26F 1/40 |
| | | | | 83/228 |
| 4,545,714 A | * | 10/1985 | Johnson | B65G 57/165 |
| | | | | 198/623 |
| 4,890,524 A | * | 1/1990 | Brown | B26D 5/14 |
| | | | | 83/615 |
| 5,234,313 A | * | 8/1993 | DelDuca | B26D 7/28 |
| | | | | 414/798.4 |
| 5,779,432 A | * | 7/1998 | Pena | B65G 57/11 |
| | | | | 198/418.6 |
| 6,267,550 B1 | * | 7/2001 | Morgan | B65G 15/14 |
| | | | | 198/419.1 |
| 10,071,868 B2 | * | 9/2018 | Overley | B65G 47/252 |
| 2001/0030104 A1 | * | 10/2001 | Schlimgen | B29C 51/44 |
| | | | | 198/418.4 |
| 2001/0041130 A1 | * | 11/2001 | Baur | B65G 57/28 |
| | | | | 414/789.2 |
| 2004/0086371 A1 | * | 5/2004 | Golden | B65B 35/50 |
| | | | | 414/798.7 |
| 2006/0278654 A1 | * | 12/2006 | Huber | B65G 57/165 |
| | | | | 221/175 |

FOREIGN PATENT DOCUMENTS

| | | | | |
|---|---|---|---|---|
| DE | 30 25 951 A1 | 2/1982 | | |
| DE | 42 44 089 A1 | 6/1994 | | |
| DE | 4244089 A1 | * | 6/1994 | ............ B65B 35/50 |
| DE | 44 36 531 C1 | 4/1996 | | |
| EP | 0 395 960 A1 | 11/1990 | | |
| EP | 0 995 582 A2 | 4/2000 | | |
| EP | 2 407 846 A2 | 1/2012 | | |
| GB | 2 061 237 A | 5/1981 | | |

* cited by examiner

STACKING STATION FOR A THERMOFORMING PLANT, METHOD FOR PRODUCING CUP-SHAPED PRODUCTS AND THERMOFORMING PLANT

CROSS REFERENCE TO RELATED APPLICATIONS

This application is the National Stage of PCT/DE2014/000146 filed on Mar. 21, 2014, which claims priority under 35 U.S.C. § 119 of German Application No. 10 2013 004 920.2 filed on Mar. 22, 2013, the disclosure of which is incorporated by reference. The international application under PCT article 21(2) was not published in English.

The invention relates to a stacking station for a thermoforming installation, to a method for manufacturing cup-shaped products in a thermoforming installation and to a thermoforming installation with a stacking station.

A number of thermoforming installations are known from the prior art. They are used for thermoplastic forming of plastic materials. The plastic materials are generally introduced into the installation as a continuous film strip or as discrete plastic layers. Inside the thermoforming installation, the plastic material runs through several stations. These stations are usually a heating station, a forming station, often a separating station and, depending on the application, a stacking station. The function of a stacking station is to stack cup-shaped products by placing them inside one another, so that product bars are produced. Herein, the term "cup-shaped" has a broad definition. In principle, it is essential that a product can be fitted into another identical product produced along with it, so that a plurality of such identical products can be stacked to form a bar. The cups can be open or closed and they can have a round or otherwise shaped outline, such as a rectangular outline. The products which, to simplify matters, are herein referred to as "cup-shaped", thus include in principle any conceivable concave objects, such as bowls, plates, cups or the like made of plastic or, as the case may be, also paper or other similar products. These can be in particular plastic bowls for packaging meat, fruits and other foods.

DE 42 44 089 A1 discloses a thermoforming installation with a stacking station. Herein, discrete bowl-shaped objects are produced in a forming tool in a forming station. However, these are not entirely separated. Rather, this publication, like most installations of the prior art, presumes that it is advantageous to retain a connection between the products by way of small webs. That way, they are substantially easier to transport. An ejector, which always ejects an entire row of formed products out of the system of joined products, is only later provided in a separating station connected downstream of the forming tool. The plate of objects produced in a production cycle, which are still connected along at least two longitudinal edges with the respectively adjacent object by way of webs, is referred to as "index", in the plural form as "indexes", this term being also used in the present application. Within the index, the objects are arranged in a grid, i.e. in rows and columns, wherein the columns refer to a lengthwise arrangement along the machine direction, and the rows of the index are therefore arranged transversely to the machine direction.

In DE 42 44 089 A1, the ejector always ejects a row of concave objects out of the index. These rows then lie on a tilting stacker. The tilting stacker is pivotably disposed on the transport device, which transports the products in the form of an index out of the forming tool. The tilting stacker executes a tilting movement, so that the objects are re-oriented. In the new orientation, there is provided a stack pusher, which pushes the stacked products provided on the tilting stacker onto a conveyor belt, referred to as a cross conveyor. The cross conveyor runs transversely to the machine direction and delivers the stacks to a longitudinal conveyor belt.

EP 0 395 960 A1 shows a longitudinal conveyor, which is divided into several adjacent shafts oriented in the direction of transport.

In a non-generic method according to DE-OS 30 25 951 a wide-track conveyor is provided, wherein, in accordance with the displacement principle, the separating section is substantially broader compared to the wide-track conveyor and is formed by several conveyor belts running next to each other. However, this disclosure does not stack the objects but arranges them behind one another.

The problem underlying the present invention is to improve or to provide an alternative to the prior art.

According to a first aspect of the invention, this problem is solved by a stacking station for a thermoforming installation, arranged for stacking a plurality of cup-shaped products from an index into a stack with a stack direction, wherein a tilting device is provided, which is arranged to tilt the cup-shaped products out of an orientation deviating from the stacking direction into the orientation of the stacking direction for stacking, wherein the products in the index are provided in columns and rows, wherein the columns are disposed longitudinally to a machine direction and the rows are disposed transversely to a machine direction, wherein the stacking station is characterized in that the tilting device has a tilting edge with an adjacent drop shaft for the products.

In this regard, the following terms need to be defined as follows:

The "stacking station" preferably only assumes the function of stacking the already separated products, but can also assume the separation and, as required, another work step or other work steps.

In general, it must be pointed out that in the context of the present patent application, indefinite articles such as "one", "two", etc. must be understood as "at least"-indications, i.e. as "at least one . . . ", "at least two . . . ", etc. provided the context does not indicate that "exactly one . . . ", "exactly two . . . ", etc. is meant.

The "stacking direction" refers to the direction of longitudinal extension of the produced stack; i.e., in a simple case of e.g. circular, rotationally symmetric products, the rotational axis.

Normally, the "orientation deviating from the stacking direction" is a vertical direction. However, the invention is not limited to a vertical orientation of the various longitudinal axes of the products and thus of the potential stacking direction of the products.

A "drop shaft" is characterized in that it provides a falling route for the cup-shaped products. This falling route can also be very short. The entry into the falling route must indirectly or directly have a "tilting edge". A tilting edge is an edge, which takes over the function of tilting the products within the stacking station. Tilting can preferably take place through the effects of gravity. The edge can be designed solid or with a continuous rod or with bolts protruding from one or several sides. It is also conceivable to use air pressure or another fluid, such as e.g. water pressure, as an aid for assisting the tilting movement at the tilting edge and the subsequent movement into the drop shaft.

The presented aspect of the invention causes the tilting of the products by way of the tilting edge and the drop shaft. The tilting stacker device of DE 42 44 089 A1, which is both costly and requires a lot of maintenance, can thus be completely dispensed with. In an ideal design, it is even conceivable that both the tilting edge and the drop shaft respectively do not have any driven parts.

It is preferable if one drop shaft is provided for each column of products, more specifically exactly one drop shaft. The products move forward in the machine direction and are provided in a grid. Thus each column moves in parallel to its adjacent column toward the tilting device. Since the tilting edge causes the tilting of the products, while the drop shaft helps or causes the stabilization of the products, so as to make it easier to subsequently stack them, a particularly good precision of movement of the discrete products is achieved, if exactly one drop shaft is provided for each column of the index, so that in terms of construction of the installation, exactly that one drop shaft is provided for each column at cavities in the forming tool.

A preferred embodiment of the invention provides that in case of one drop shaft, respectively in case of several drop shafts, the one drop shaft, respectively the drop shafts, is/are provided either individually or together as an exchangeable module.

Depending on the design, it may be important with regard to the reliability of the tilting of the products to precisely adapt the geometry of the drop shaft to the geometry of the forming tool and thus to the geometry of the manufactured products. Indeed, the tilting shaft must ideally allow for a change of orientation of the product ejected from the index, without additional drives, i.e. allow for a gravitationally assisted movement of the products. Thus, for example, a drop shaft ideally adapted to a product can provide guide edges, guide rails or the like for the product moving through it, and/or the drop shaft can provide braking systems for the product, and/or the drop shaft can provide a deflection for the moving product, or the like. Therefore, it is desirable, when producing a thermoforming installation, to be able to use the drop shaft as a module adapted to a forming tool, which generally also consists of a module for production of all the products of an index. It is also advantageous, in case the operator of the thermoforming installation changes the products to be manufactured, if the drop shafts can be exchanged either as one module per drop shaft or as one module for all drop shafts. Ideally, a drop shaft module consists of several drop shafts, which are connected with each other, so that in case of damage to one of the drop shafts, it is not necessary to exchange the entire multi-shaft module, but only the one damaged drop shaft can be replaced.

It has already been briefly suggested above that it can be advantageous if the drop shaft is designed to let the products fall along the drop shaft, accelerated by gravity.

On their way from separation to completed stacking, the products ordinarily require two different movements: on the one hand, they must execute a tilting movement, so that the products, which are oriented, as a rule, along a vertical axis when they come out of the forming tool and the separating device, do not have to be vertically stacked, but preferably recumbently rather than upright. On the other hand, a change in orientation is provided in most cases, during which the product is displaced downward from the geodetic height of the index. The invention has discovered that providing an electromechanical drive for the change in orientation implies unnecessary efforts and therefore unnecessary expenses for the buyer of a thermoforming installation. Instead, it seems to the inventors that it is more expedient to use gravity for accelerating the product downward. The products can then bring about the frequently desired downward change in orientation through their own weight.

For the sake of completeness, it must be pointed out that a constellation, in which a braking force is opposed to the gravity of the falling product, so that an acceleration of the product on its way downward through the drop shaft may sometimes not be observable, can also fall under the present wording. However, in the preferred embodiment, the product increases its speed on its way through the drop shaft, at least along a section of the drop shaft.

When a fall brake is provided, the falling products can be slowed down by friction laterally, and/or on their upper side and/or on their bottom side, preferably however on at least two opposite sides. On the one hand, this can ensure a noise reduction during production; on the other hand, the edges of the products onto which the products fall at the bottom of the shaft are better preserved.

A suitable fall brake can be a brush for example.

With regard to the design of the installation, it is proposed to attach a stacking line to the drop shaft.

DE 42 44 089 A1 stacks the products directly below the ejector, i.e. in vertical direction. The further handling of the products then takes place without additional stacking. The tilting stacker rather lays the already formed stack geodetically downward and simultaneously onto the side. From there, it is transported onwards, but no additional stacking takes place.

In contrast, in the present invention, a stacking preferably also takes place after the product has passed over the tilting edge and through the drop shaft. The underlying idea of this aspect is that products that are initially either completely un-stacked discrete products or pre-stacked products are tilted and displaced downward through the drop shaft. The term "pre-stacked" products refers to the fact that a small stack of products is produced, which however has a smaller number of stacked products than the finished stack ultimately leaving the thermoforming installation or at least the stacking station it its first step. In particular, only one, two or three products are provided in a pre-stack, which is then tilted and falls through the drop shaft, whereupon the smaller stacks are stacked into a greater stack still in the same installation, but with lying pre-stacks, i.e. with tilted pre-stacks. To this end, the pre-stacks can be simply pushed into one another in their tilted position. The stacking line is preferably placed so that it begins under the drop shafts, so that the installation can be very short and so that, in an ideal embodiment, no additional drive is required in the horizontal direction as a complement to a stack pusher, which causes the stacking of the lying products, until either the final stacks or at least another stack of pre-stacks is formed.

The mentioned stacking line is preferably tilted upward or tilted downward in the machine direction or horizontal, preferably together with a pusher, particularly preferably optionally adjusted according to the product.

An adjustability of the angle can be provided.

When the stacking line is tilted upward in the machine direction, a component of the gravity of the products, which are stacked or at least stacked beyond the pre-stacking state, acts against the machine direction. A pusher can then use the component of the gravity acting against the pushing direction to cause a stacking. Concretely, the pusher must only convey a new tilted product provided by the drop shaft, preferably in a pre-stacked state, in the machine direction and thereby push it into the already formed stack. Due to the force component of the already formed stack acting against this direction, the already formed stack does not need to be held, or only a little. This irrespectively of whether the pusher is formed as a feed rod and directly takes hold of the products, for example inside of the products, or whether the pusher is configured, for example, as a conveyor belt.

Pushing in the machine direction preferably takes place with the concave side pointing ahead. The passage through the stacking station can then be particularly simply designed: the products are preferably produced in the forming tool with the concave side oriented upward. An ejector can then simply separate the products by ejecting them downward out of the index. They then still lie with their concave side upward and can, if desired, form pre-stacks, simply due to gravity. During tilting, the products can be tilted, preferably with the concave side oriented forward. To this end, they merely must be transported over the tilting edge in the machine direction. The pusher can then seize them, for example on the convex side, and push them onward in the machine direction.

In such a constellation, a reversal of the lying direction of the cup-shaped products is particularly easily achievable by conveying them, after ejection out of the index, against the machine direction over the tilting edge, ideally into drop shafts provided there, instead of in the machine direction. They then lie with the concave side oriented away from the machine direction and a pusher can for example reach inside the concave side.

A transport means of the discrete ejected products is preferably configured so that it can optionally convey either in a first or in a second direction, preferably in the machine direction or against the machine direction, wherein two tilting edges with respectively associated drop shafts are provided. A stacking station configured in this manner can stack different kinds of products without any back-fitting, if the tilting edges or at least the drop shafts are adapted to the various products. In one case, a stack is then formed, in which the convex side is oriented forward, in the other case, a stack is formed, in which the concave side is oriented forward. Only the movement of the pusher may need to be programmed in another way. However, no mechanical back-fitting is required.

The same advantage is achieved if several types of drop shafts are provided and if the route of the separated, preferably stacked, products can be influenced, so that they are guided either to a first or to a second or to another drop shaft or drop shaft module. To this end, a drop shaft module, can move along a stationary tilting edge, or the tilting edge can be moved, for example by way of a displacement of the transport means, which receive the ejected and separated products and transports them onward, for example a conveyor belt.

The pusher, which can also be referred to as a stack pusher, pushes the preferably pre-stacked products out of the area of the drop shafts and either into the final stack or into another stack.

The stack pusher is preferably driven by an electro-motor. It can have an open-loop control or a closed-loop control. In general, in order to improve readability, the term "control" will be used within the context of the present patent application. The term control will herein include on the one hand an open-loop control, but shall also explicitly include a "closed-loop control" as a subcase of control, unless, in individual cases, only an open-loop control is meant and not a closed-loop control. However, when referring to a "control" without any additional indication, it shall be assumed that a "closed-loop control" is also explicitly disclosed.

It is proposed that the stacking line has a pushing brake, which is configured to slow down products pushed by a pusher toward the stack along their sides.

Such a pushing brake can for example consist of a ribbed lateral structure, or brushes can be provided, or air pressure can be built up as counter-pressure, for example by means of compressed air nozzles. In principle, any means that exert a targeted force, against the direction of pushing, within the stacking line, onto the sides of the products pushed toward stacking can be used.

Regarding the entry into the stacking station, it is proposed to provide an ejector that is configured to eject the products out of the index directly onto the tilting edge. In such a configuration of the installation or at least of the stacking station, another conveying means, which first receives the ejected products and then transports them to the tilting edge can be dispensed with.

According to a second aspect of the present invention, this problem is solved by a stacking station for a thermoforming installation, arranged for stacking a plurality of cup-shaped products from an index into a stack with a stack direction, wherein a tilting device is provided, which is arranged to tilt the cup-shaped products out of an orientation deviating from the stacking direction into the orientation of the stacking direction for stacking, wherein the products in the index are provided in columns and rows, wherein the columns are disposed longitudinally to a machine direction and the rows are disposed transversely to a machine direction, wherein the stacking station has a pre-stacking device, which is disposed upstream of the tilting device, so that the stacking station is designed to simultaneously tilt several products of a column as a pre-stack, wherein the stacking station is characterized in that it is arranged to push the tilted pre-stacks of each column, in the machine direction, directly into a respectively associated stack to be transported out of the stacking station.

This aspect of the invention also saves an entire installation unit compared to DE 42 44 089 A1: namely the cross conveyor, which in the specification is connected downstream of the pusher and first receives the discrete pre-stacks without further stacking, then conveys them transversely and only subsequently discharges them out of the installation, wherein not even a final stacking of the pre-stacks takes place. Rather, in the specification, the product stacks first formed by means of the ejector are discharged as final stacks.

In contrast, the present invention has discovered that it is advantageous to first only produce pre-stacks or discrete products in the ejector and to carry out the final stacking of the products horizontally.

In order to push the tilted pre-stacked products into a stack, it is proposed to provide a pusher, which is setup to push the products, in the stacking direction, into the stack, according to a stacking rhythm.

It must be explicitly stressed that the stacking rhythm must not necessarily correspond to the tilting rhythm but is preferably tuned to the tilting rhythm. Ideally, a pusher rhythm is identical to the tilting rhythm. This means that after each tilting of a product, or of a row of products, the pusher carries out a pushing movement of the tilted products or pre-stacks.

However, in the preferred embodiment, not every discharge is also a stacking, i.e. the final production of a stack to be transported away; rather, the stacking rhythm is lower than the pushing rhythm. When the various rhythms are synchronized in this manner, a feed motion of the pusher can take place after each tilting and fall of products or pre-stacks through the drop shaft into the operating area of the pusher in the stacking line, wherein the product or the pre-stack that just fell down is pre-stacked onto a greater pre-stack, namely by pushing the various products or pre-stacks into one another in the stacking line. After n cycles, the stack has either become so big that it is automatically seized by a transport mechanism, or the pusher carries out a stacking stroke and thus a pushing stroke, or another transport means carries out a discharge of the final stack.

The pusher is preferably designed to push several pre-stacks into the stack at the same time.

The provided stacks to be formed from one row are preferably flush with the associated row of the index.

In such a configuration, a transverse transport is not necessary. The discrete products from the rows of the index can rather move forward in the machine direction without impairment. They reach the ejector, are separated, are fed either discretely or in a pre-stack toward the tilting edge and the drop shaft, are pushed onward in the machine direction by the pusher and finally reach their stack, without a lateral deviation from the machine direction having taken place.

A pusher is preferably arranged to carry out one of two pushing stages, wherein a first pushing stage includes a shorter feed motion and a second pushing stage includes a longer feed motion, wherein the first pushing stage is arranged for stacking pre-stacks and wherein the second pushing stage is arranged to push the products onward for further transport.

It must be pointed out that more than two pushing stages can also be provided.

According to a third aspect of the present invention, this problem is solved by a stacking station for a thermoforming installation, arranged for stacking a plurality of cup-shaped products from an index into a stack with a stack direction, wherein a tilting device is provided, which is arranged to tilt the cup-shaped products out of an orientation deviating from the stacking direction into the orientation of the stacking direction for stacking, wherein the products in the index are provided in columns and rows, wherein the columns are disposed longitudinally to a machine direction and the rows are disposed transversely to a machine direction, wherein the stacking station has an ejector device, which ejects single pieces and brings the ejected single pieces to a pre-stack conveyor device, which conveys the single pieces to the tilting device according to a pre-stack conveying cycle, wherein the stacking station is characterized in that the pre-stack conveying cycle carries out a feed motion into the tilting device after each ejection.

It must be mentioned that the term "pre-stack conveyor device" is already known from DE 42 44 089 A1: in that specification, the products are also ejected by an ejector (not shown) out of the index into discrete stacks. In this form, the already produced stacks reach the actual stacking station, i.e. the state shown for example in FIG. 1 of the specification. The conveyor belt 3 presented there is therefore not the belt, with which the original plastic foils or plastic plates were transported. Rather, the transport of the plastic layer and the production of the cup-shaped products is carried out above and upstream of the situation shown in the specification by means of a tool having cavities. Therefore, the shown conveyor belt 3 is a "pre-stack conveyor device", if the stacks disclosed there are subsequently stacked into bigger stack units.

In DE 42 44 089 A1, the pre-stack conveying cycle is adjusted to the tilting device in such a manner that all the stacks are first completely guided by the ejector. The production process in the forming tool then needs to be stopped and the individual rows are pushed forward, one after the other, into the tilting device, concretely into the tilting stacker 6. There, the rows are tilted row after row and subsequently fed onto the cross-conveyor 4.

In contrast, according to the third aspect of the invention presented here, after each ejection of several rows, a feed motion of the pre-stack conveyor device to the tilting edge into the tilting device is simultaneously carries out. Thus, different numbers of products are provided in the various rows of pre-stacks in the pre-stack conveyor device at any given time. In spite thereof, a stack with an identical number of products is tilted at each feed motion into the tilting device.

The feed motion preferably aims to achieve a lesser number of products than a number of rows in the index. This is the constructive way for forming pre-stacks, even if a feed motion of the pre-stack conveyor device takes place at each ejection cycle.

According to a fourth aspect of the present invention, this problem is solved by a stacking station for a thermoforming installation, arranged for stacking a plurality of cup-shaped products from an index into a stack with a stack direction, wherein a tilting device is provided, which is arranged to tilt the cup-shaped products out of an orientation deviating from the stacking direction into the orientation of the stacking direction for stacking, wherein the products in the index are provided in columns and rows, wherein the columns are disposed longitudinally to a machine direction and the rows are disposed transversely to a machine direction, wherein the stacking station has an ejector device, which ejects single pieces out of the index and wherein the ejector device preferably brings the ejected single pieces to a pre-stack conveyor device, which conveys the single pieces to the tilting device at a pre-stack conveying rhythm, from where the single pieces are pushed as pre-stacks into a stack, wherein the preferred combination of features described takes effect if the ejection out of the index takes place directly onto the tilting edge, wherein the stacking station is characterized in that in addition to pushing the single pieces into the stack, it is arranged to actuate an alternative conveying route, which discards a single piece.

In contrast to the prior art, it is thus possible, in the context of a quality control, or for example when starting up the installation or for example when starting up the heating station, to discard discrete pieces, or for example discard respectively at least one row of pieces.

Control of whether the single piece is pushed into the stack or whether it is discarded can take place either manually or measurement devices can be provided, which are arranged to assess the quality of the product and to automatically initiate disposal, if certain limit values are not reached or exceeded.

If at least one of the products of a row must be discarded, it is preferable if all the products of a row are discarded. This makes it possible to otherwise maintain an identical stacking rhythm. In addition, it can be assumed that it is quite probable that the products adjacent to the product that did not pass the quality control will also not be ideal.

In order to actuate the alternative conveying route, the pre-stack conveyor device can for example be arranged to carry out a conveying motion in the opposite direction, as an alternative to the feed motion toward the tilting device.

Ideally, a waste collector is disposed upstream of the pre-stack conveyor device direction, for example a simple basket or bucket for the waste. The term "upstream" here means that the waste is to be conveyed in the direction opposite to the actual conveying direction toward the stack, i.e., in a way, upstream with respect to the machine direction, when the machine direction leads constantly toward the stack.

In an alternative or cumulative embodiment, the drop shaft can have a deflector device, which is adapted to be switched into the path of the falling products. This also allows easily removing products to be discarded out of the route toward the stack.

It goes without saying that a stacking station can implement several of the aforementioned features simultaneously, preferably all the afore-mentioned aspects of the invention.

According to another aspect of the invention, the problem is solved by a method for producing cup-shaped products in a thermoforming installation, wherein products are first ejected from an index by means of an ejector device, are pre-stacked where required, and are stacked, in a lying position, into a stack, by means of a pusher, after having tilted over a tilting edge into a drop shaft.

It must be explicitly mentioned that all the afore-mentioned aspects and individual features can also be implemented in the advantageous method.

It goes without saying that a thermoforming installation directly benefits from the advantages of the stacking station and/or of the method.

Irrespective of the concrete design of the rest of the installation, it is proposed that an adjustment device for a tilting point of the products is provided at the tilting edge.

Depending on the products to be manufactured, on the temperature of the plastic when it reaches the tilting edge or on additional or other parameters it can be expedient to adjust the tilting point. More specifically, the adjustment device can be constructively designed in such a manner that it consists in a conveyor belt leading up to the tilting edge with an adjustable inclination, that the distance between this conveyor belt and the tilting edge or the drop shaft is adjustable and/or that the inclination of the drop shaft is adjustable.

In the following, the invention is explained in more detail based on exemplary embodiments with reference to the drawings.

Figure 2:
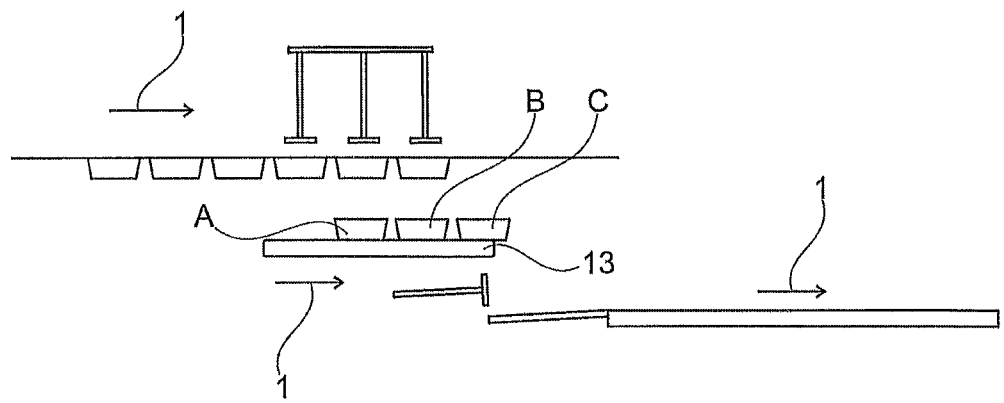
Figure 3:
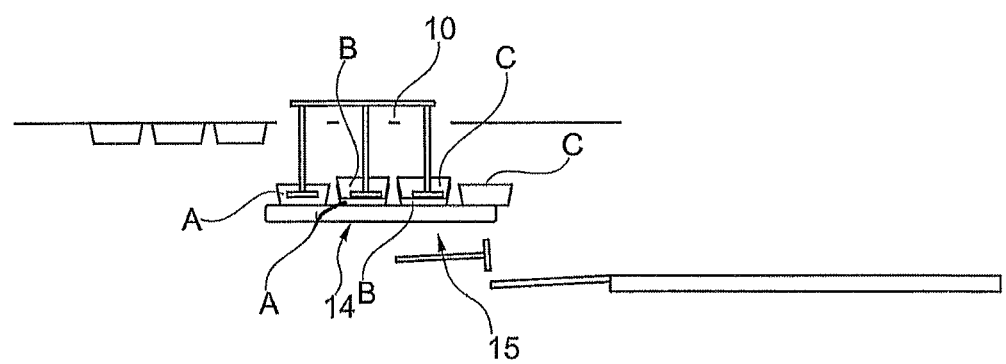
Figure 4:
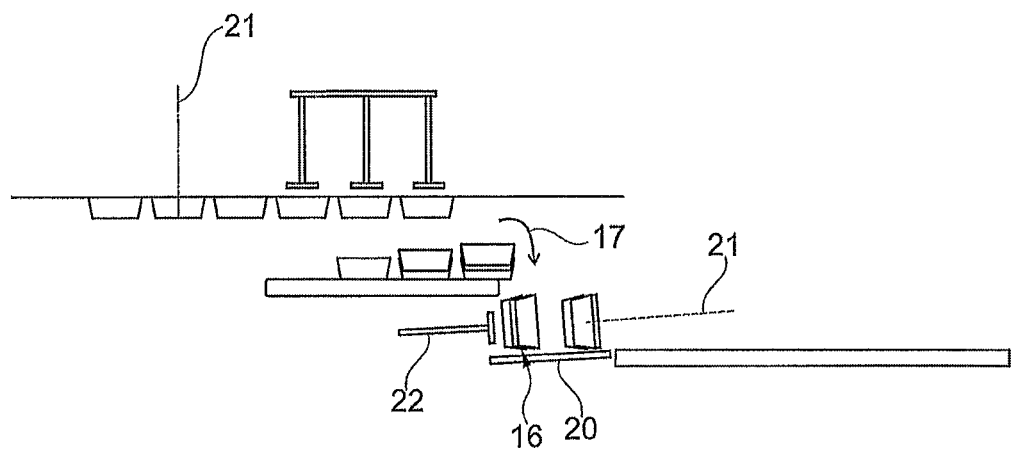
Figure 5:
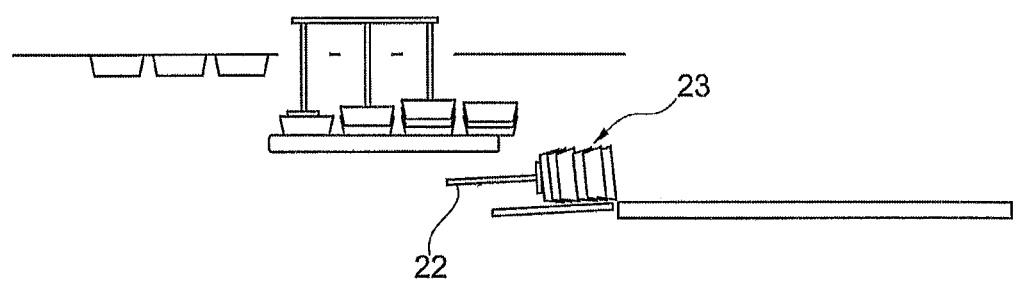
Figure 6:
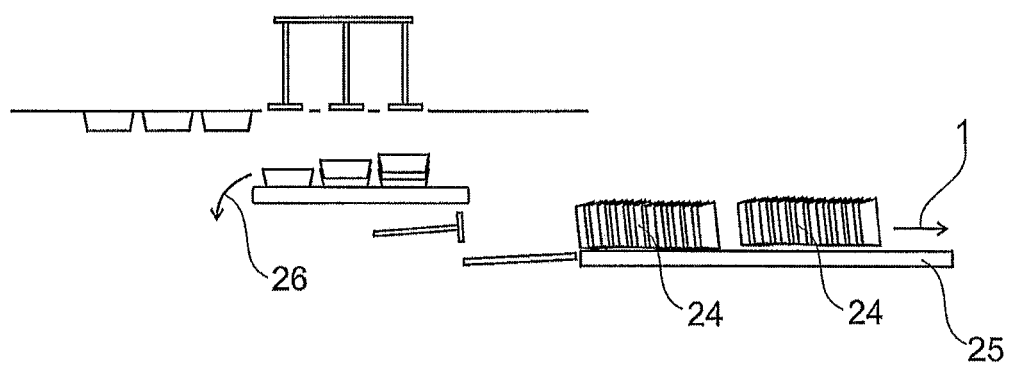
Figure 7:
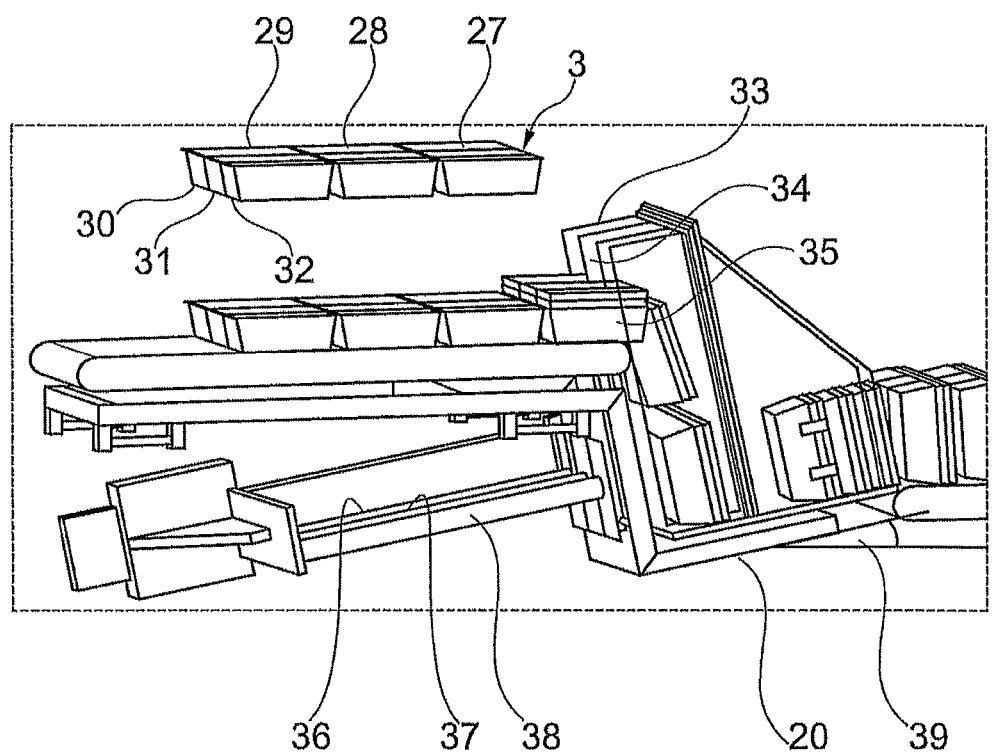
Figure 8:
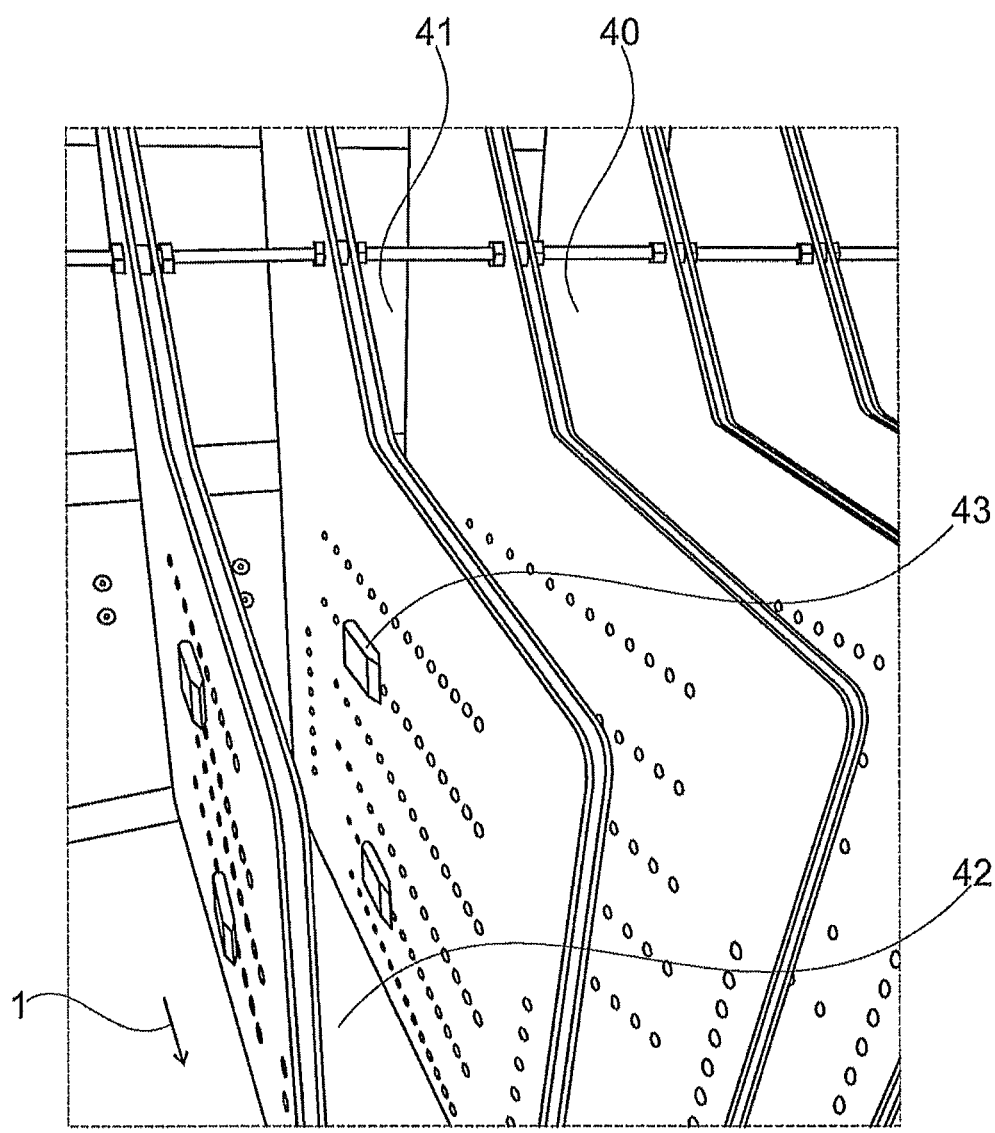

FIG. 1 schematically shows a lateral view of a stacking station of a thermoforming installation, with an ejector, a plurality of products, a film, a pre-stack conveyor belt, a pusher, a tilting edge, a drop shaft, a pusher and a stack conveyor belt, FIG. 2 shows the schematic view of FIG. 1 after a first ejection cycle, FIG. 3 shows the view of FIGS. 1 and 2 during a second ejection cycle, FIG. 4 shows the view of FIGS. 1-3 after the second ejection cycle, FIG. 5 shows the view of FIGS. 1-4 during a third ejection cycle, FIG. 6 shows the view of FIGS. 1-5 after the third ejection cycle, FIG. 7 schematically shows a three-dimensional view of a part of the stacking station, FIG. 8 shows an exemplary embodiment of a module with a plurality of drop shafts.

In the schematically shown thermoforming installation, a particularly preferred method according to the invention runs as follows:

A forming tool (not shown) is disposed upstream of the stacking station 2 in the machine direction 1, i.e., in a simple linear construction of a thermoforming installation, to the left of the longitudinal extension shown in FIG. 1.

The forming tool is a cavity tool, which is arranged to produce three rows of products in an index 3 in the machine direction 1, i.e. a product C of a first row, a product B of a second row and a product A of a third row. The number of columns of the index is discretionary. To simplify matters, since the view shown here is a lateral view, only one product and not an entire row or several products will be spoken of herein, since only the product, in the present example located entirely to the right of a row of the index, can be visibly shown in a lateral view.

The produced products A, B and C are joined with each other by small notches 4, so that they can be transported through the installation beyond the thermoforming station while still being joined with a film 5

Due to the fact that also a plurality of indexes are connected in the machine direction, the indexes run under an ejector 6 while being connected. The ejector 6 has respectively one ejection arm 7 (exemplarily labeled) for each row in the index, i.e. here for product A, for product B and for product C. The three ejector arms 7 are connected to each other by way of an ejector bridge 8.

The installation clocks its feed motion in accordance with the length 9 of a single piece, i.e. the length of the products of an index produced in the forming tool during one stroke and one cycle.

As soon as the film 5 with the single piece 9 and thus the three rows of products A, B and C has arrived in the ejector 6 and has stopped there, the ejector 6 moves downward with its ejector arms 7. In doing so, each of the ejector arms 7 reaches into its associated product A, B or C. Thereby, the notches 4 are ripped by the traction force induced therein and the products A, B, C detach from the film 5 thus forming single pieces. Only the residual film grid 10 remains downstream of the ejector 6.

A pre-stack conveyor 11 is located below the level of the film 5 and of the residual film grid 10 on the level of the ejector 6.

The stroke of the ejector 6 is adjusted such that the products A, B, C are ejected onto the pre-stack conveyor in the same constellation and come to rest there in the same arrangement relative to each other as within the index 3.

Once the three products A, B, C have arrived on the pre-stack conveyor 11, the conveyor advances one cycle in the machine direction 1.

However, while the film 5 is fed forward at each cycle by an amount corresponding to an entire single piece, in the example shown here, to the length 9 of the single piece with three products, respectively three cavities in the forming tool, the pre-stack conveyor 11 moves synchronously but only carries out a feed motion in the machine direction 1 that corresponds to the length 12 of a cavity, thus of respectively only one product A, B, C.

The ejector 6 moves back upwards, the film 5 advances by the length 9 of a single piece and one cycle is ended (shown in FIG. 2).

In this state, the foremost cup-shaped product C is still located on the pre-stack conveyor having advanced by one stroke of a length 12 of a cavity. The pre-stack conveyor is positioned in such a manner that there is still a little more space downstream, in the machine direction 1, of the ejected products A, B, C, than the length 12 of a cavity, so that the foremost product C can still rest safely on the pre-stack conveyor 11, because its center of gravity is still upstream, in the machine direction 1, of a tilting edge 13.

The pre-stack conveyor 11 is adjustable both in the machine direction 1 and in its inclination relative to the horizontal. This allows precisely adjusting to what extent a foremost product C is still lying on the pre-stack conveyor 11 after one feed motion cycle or whether it has for example already fallen over the tilting edge 13.

At the beginning of the second cycle (shown in FIG. 3) the ejector 6 again carries out an ejection stroke and ejects three identical products A, B, C out of an identical index in the film 5, concretely out of the residual film grid 10 thus formed.

The ejector 6 is controlled in such a manner that it does not exert a vertically downward coercive force as far as the pre-stack conveyor 11. The reason for this is that the place for the two front products B, C of the index 3, in which the ejector 6 would eject the two front products B, C from the film 5, is already occupied by respectively one product, namely the two rearward products A, B. The consequence thereof is that the rearmost product A is ejected directly onto the pre-stack conveyor 11 as a result of the feed stroke of the pre-stack conveyor 11 but that the middle product B is pushed into a once rearward product A, located below it, having advanced as a consequence of the feed stroke; similarly the respectively forward product C is ejected downward out of the film 5 into the once middle product B after its displacement. This results in a single product, formed by the respectively rearmost product A, as well as two first pre-stacks 14, 15 and, in the start-up phase of the installation, an additional single product located downstream, namely the very first advancing product C (shown in FIG. 3 until now), being located on the pre-stack conveyor.

In order to end the cycle, the ejector 6 moves back upwards and the pre-stack conveyor 11 again carries out a feed motion by the length 12 of a cavity in the machine direction 1.

The respectively foremost pre-stack 16 (shown in FIG. 4, wherein the drawn representation is however based on a longer installation feed motion) is conveyed by the pre-stack conveyor 11 in the machine direction over the tilting edge 13. As a consequence of the weight of the respectively foremost pre-stack, the pre-stack tips over into a drop shaft 18 in a tilting direction 17 (indicated in FIG. 4). Walls 19 (exemplarily labeled) of the drop shaft 18 stabilize the products in the respectively foremost pre-stack during its tilting and falling motion in the drop shaft 18 until the falling pre-stack comes to lie on a stack floor 20. Thus the products A, B, C lie on the stack floor 20 in the tilted direction, therefore with a rather flat-lying or even horizontally oriented product axis 21.

A pusher 22 is provided on this third level of transport of the product. It can be displaced forward parallel to the stack floor 20, namely in the machine direction. That way, it can push a first pre-stack into a second pre-stack, so that either a finished stack or an enlarged pre-stack 23 is formed (shown in FIG. 5).

Any number of pre-stacks can be amassed on the stack floor 20 until a stack 24, to be transported out of the stacking station, is ultimately formed. The finished stack 24 is then pushed by the pusher 22 onto a removal conveyor 25, so that the finished stacks can be transported in the machine direction 1 out of the stacking station.

If it is determined during production that a product located in an index 3 does not fulfill quality requirements, a deflector device, located for example in the drop shaft 18, can be activated and the row of products is discharged, wherein, in such a case, the pre-stack conveyor 11 preferably does not carry out its feed motion in the cycle; or the pre-stack conveyor 11 is activated against the machine direction 1, so that a waste product can be removed in a discharging direction 26 (indicated in FIG. 6).

It has already been explained that the previously described, particularly preferred process sequence according to the invention (shown in FIGS. 1-6) preferably takes place simultaneously for all products of a row 27, 28, 29 of an index 3, so that in the case of three columns 30, 31, 32 of a row 27, 28, 29 for example, three drop shafts 33, 34, 35 can be provided, in order for the products of each column 30, 31, 32 to separately fall into respectively one drop shaft 33, 34, 35 (shown in FIG. 7), wherein also one pusher with three pushing fingers 36, 37, 38 is preferably provided, in order for each pushing finger 36, 37, 38 to be able to enter exactly one drop shaft 33, 34, 35 and to transport the products on the stack floor 20 onward in the machine direction.

As shown in FIG. 7, the entirety of the drop shafts 33, 34, 35, together with the stack floor 20 and the pushing fingers 36, 37, 38, can be tilted at an angle 39 relative to the horizontal. However, they do not have to be inclinable, and/or the angle 39 can amount to zero or it can be negative, i.e. with a descending slope.

The various drop shafts are preferably provided with sheet metal lateral walls 40 (exemplarily labeled, see FIG. 8).

Downstream of a tilting edge 41 the products can thus fall downward between the lateral walls in a safely guided manner onto the stack floor 42. Resilient and ribbed lamellas 43, which are attached to the lateral walls 40, preferably at various heights, secure the products against inadvertently tilting forward in the machine direction 1. The lamellas 43 are preferably attachable, by means of mounting devices disposed in a grid-like manner, such as e.g. the holes shown here, so as to be displaceable in the machine direction 1, so that they can be disposed in a respectively targeted manner for various lengths of stacks.

The lateral walls 40 of the drop shafts are preferably connected to each other, for example by way of a continuous screw, so that all the drop shafts can be exchanged as a module.

LIST OF REFERENCE NUMBERS 1 machine direction
2 stacking station
3 index
4 notch
5 film
6 ejector
7 ejector arm
8 ejector bridge
9 length of a single piece
10 residual film grid
11 pre-stack conveyor
12 length of a cavity
13 tilting edge
14, 15 first pre-stacks
16 foremost pre-stack
17 tilting direction
18 drop shaft
19 walls
20 stack floor
21 product axis
22 pusher
23 enlarged pre-stack
24 stack
25 removal conveyor
26 discharge direction
27, 28, 29 rows
30, 31, 32 columns
33, 34, 35 drop shafts
36, 37, 38 pushing fingers
39 angle
40 lateral wall 41 tilting edge
42 stack floor
43 lamellas

The invention claimed is:

1. A stacking station to stack thermoformed cup-shaped products formed from a continuous film strip in a thermoforming installation comprising:
   an ejector that ejects the cup-shaped products from an index;
   a pre-stack conveyor situated below the index, the pre-stack conveyor receiving the cup-shaped products ejected from the index to form pre-stacks of the cup-shaped products;
   a tilting device situated downstream of the pre-stack conveyor and comprised of a tilting edge adjacent to the pre-stack conveyor, the tilting edge tilts the cup-shaped product from a pre-stack orientation to a stacking orientation;
   a drop shaft situated adjacent to the tilting edge of the tilting device, the drop shaft receiving the tilted cup-shaped products from the tilting device, the drop shaft including walls, a stack floor, and a fall brake that slows down the tilted cup-shaped products via friction falling through the drop shaft from the tilting edge to the stack floor; and
   a deflector device situated in the drop shaft, the deflector device being activated to discharge a row of the cup-shaped products if one of the cup-dash shaped products does not fulfil quality requirements.

2. The stacking station of claim 1, wherein the ejector includes at least one ejector arm that engages the cup-shaped products to eject the cup-shaped products from the index.

3. The stacking station of claim 1, wherein the cup-shaped products are formed from an index into stacks, wherein the cup-shaped products in the index are arranged in columns that are substantially parallel to a machine direction of the stacking station and in rows that are substantially perpendicular to the machine direction of the stacking station.

4. The stacking station of claim 3 further comprising a pusher situated below the pre-stack conveyor and a removal conveyor situated adjacent to and downstream of the pusher.

5. The stacking station of claim 4, wherein the pusher pushes the tilted cup-shaped products from the stack floor of the drop shaft to the removal conveyor to form stacks of the cup-shaped products.

6. The stacking station of claim 5, wherein the pusher includes a first pushing stage that has a shorter feed motion to stack the pre-stacks from the pre-stack conveyor and a second pushing stage that has a longer feed motion to push the products onward for further transport.

7. The stacking station of claim 6, wherein the pusher includes a pushing finger for each column of cup-shaped product, wherein the pushing finger for each column enters a corresponding column of the drop shaft to transport the cup-shaped product on the stack floor in the machine direction of the stacking station.

8. The stacking station of claim 7, wherein the stack floor and the pushing fingers are tilted at an angle with respect to horizontal.

9. The stacking station of claim 1 further comprising a stacking line connected to the drop shaft, the stacking line being titled upward in a machine direction of the stacking station.

10. The stacking station of claim 9, wherein the stacking line includes a pushing brake that slows down the cup-shaped products pushed by the pusher.

11. The stacking station of claim 1, wherein the drop shaft includes a column for each column of each of the cup-shaped products in the index.

12. The stacking station of claim 11 further, wherein each column of the drop shaft includes lamellas attached to the walls that prevent the cup-shaped products falling through the drop shaft from inadvertently tilting forward.

13. The stacking station of claim 12, wherein the drop shafts are arranged as exchangeable modules.

14. The stacking station of claim 13, wherein the cup-shaped products fall through the drop shaft via gravity.

15. The stacking station of claim 14, wherein the stack floor and the drop shaft are tilted at an angle with respect to horizontal.

* * * * *